(12) United States Patent
Jex et al.

(10) Patent No.: US 6,721,758 B1
(45) Date of Patent: Apr. 13, 2004

(54) SYSTEM AND METHOD FOR USING SCHEMA ATTRIBUTES AS META-DATA IN A DIRECTORY SERVICE

(75) Inventors: Alan R. Jex, Highland, UT (US); Farrell Lynn Brough, South Jordan, UT (US); Ronald M. Tanner, Provo, UT (US)

(73) Assignee: Novell, Inc., Provo, UT (US)

( * ) Notice: Subject to any disclaimer, the term of this patent is extended or adjusted under 35 U.S.C. 154(b) by 341 days.

(21) Appl. No.: 09/821,045

(22) Filed: Mar. 30, 2001

(51) Int. Cl.[7] .............................................. G06F 17/30
(52) U.S. Cl. ...................................... 707/103; 717/165
(58) Field of Search ........................... 707/103; 717/165

(56) References Cited

U.S. PATENT DOCUMENTS

| | | | |
|---|---|---|---|
| 5,628,007 A | | 5/1997 | Nevarez |
| 5,692,129 A | * | 11/1997 | Sonderegger et al. ... 707/103 R |
| 5,692,180 A | | 11/1997 | Lee |
| 5,794,232 A | | 8/1998 | Mahlum et al. |
| 5,878,415 A | | 3/1999 | Olds |
| 5,893,107 A | | 4/1999 | Chan et al. |
| 5,987,450 A | | 11/1999 | Levy |
| 6,016,499 A | * | 1/2000 | Ferguson .................. 707/104.1 |
| 6,052,686 A | | 4/2000 | Fernandez et al. |
| 6,105,069 A | | 8/2000 | Franklin et al. |
| 6,170,009 B1 | * | 1/2001 | Mandal et al. .............. 709/223 |
| 6,539,425 B1 | * | 3/2003 | Stevens et al. ............. 709/220 |

* cited by examiner

Primary Examiner—Wayne Amsbury
(74) Attorney, Agent, or Firm—Mintz Levin Cohn Ferris Glovsky and Popeo PC

(57) ABSTRACT

A system and method for using schema attributes as meta-data is disclosed. A directory service is provided for use with a computer system or network to aid in storing and managing data or other information related to the system. A group of attributes having special names or meaning are provided and may be included in a class schema. If the meaning or use of a class changes after its creation, additional attributes may be added into the class schema. The directory service may also be configured to define or determine relationships between various object classes in a directory system via specially named relationship classes, wherein the relationships are defined or determined before any instances of the classes exist in the directory.

40 Claims, 9 Drawing Sheets

SYSTEM AND METHOD FOR USING SCHEMA ATTRIBUTES AS META-DATA IN A DIRECTORY SERVICE

FIELD OF THE INVENTION

The invention relates generally to computer-based directory services, and more particularly to a system and method for using schema attributes as meta-data in a directory service.

BACKGROUND OF THE INVENTION

Computer systems generally comprise two or more computers networked together to enable the sharing of applications, services, and information. Most computer systems store and maintain data (in various formats) relating to the many network resources that comprise the system. Examples of such resources may include, but are not limited to computers and various peripheral devices (e.g.—printers, RAID devices, etc.), as well as users, files, and e-mail addresses. Directory services are a valuable tool utilized by computer systems to aid in storing and maintaining this data.

A directory service typically identifies all of the resources on a network and makes them accessible to users and applications. Currently, many computer systems utilize distributed directories. A distributed directory is a single directory that spans (and is shared by) multiple networking servers. Most distributed directories are based on the X.500 ITU (International Telecommunication Union) standard which structures directories in a hierarchical fashion, having different levels for different categories of information. Many directory service providers utilize hierarchical databases, which may be referred to as either "directory service databases" or "directory service repositories." Distributed directories based on the X.500 standard allow for information to be created, read, and modified by clients having the appropriate access rights. This information may be shared across a plurality of servers and clients.

One example of a well-known directory service or system that uses a distributed directory with a hierarchical database structure is NetWare Directory Services™ ("NDS") by Novell Corporation. The structure of at least one NDS directory system may be understood by defining terms such as meta-data, schema, and instance.

Traditionally, meta-data in a directory system may describe the syntax or format of data so that the system may understand how data is being represented in the system. Meta-data may also specify that a directory system may have attributes, and that these attributes may be grouped into entities known as classes. Generally, meta-data defines the model for schemas in a directory system.

A schema typically defines a set of attributes that are defined together to define or describe a class. NDS allows network administrators to create classes in the schema using attributes defined by the administrators. Each attribute in a class has certain information associated with it, such as an attribute name and an attribute syntax type. The attribute name identifies the attribute, while the attribute syntax limits the values that are assumed by the attribute. In addition to defining attributes or properties, classes may also contain other meta-data describing the behavior of the class.

Once a network administrator has created a class, users having appropriate access rights may then create objects based on that class. These objects, also referred to as instances of the class, are then entered into the distributed directory. Multiple instances of the same class may exist in a directory as long as each possesses a unique name. Although objects in a distributed directory tend to represent computer-related entities (e.g.—computers, printers, users), those skilled in the art understand that objects may also represent a variety of non-computer-related entities such as companies, departments, buildings, or the like.

One feature of directory service hierarchical databases allows for classes to be derived from (or based upon the declaration of) other classes. This concept, known as inheritance, is explained with reference to FIG. 1. FIG. 1 illustrates a portion of a distributed directory 100 wherein each block illustrated represents a class. For ease of explanation, assume that a help desk policy class 110 exists in distributed directory 100, and is derived from (or based on the declaration of) a general policy class 120, a WINDOWS 98™ type policy class 130, a user type policy class 140, and a scheduled feature policy class 150. Because help desk policy class 110 is derived from policy classes (120, 130, 140, 150), any instances (or objects) of the help desk policy class 110 created in directory 100 must contain all of the mandatory attributes defined by its own class definition (which may be none), as well as all of the mandatory attributes defined in the class definitions of policy classes (120, 130, 140, 150). This is because valid instances or objects of a derived class must include the mandatory attributes of the base class or classes from which it is derived. Help desk policy class 110 may be referred to as a derived class or subclass because it inherits the characteristics of policy classes (120, 130, 140, 150). In turn, policy classes (120, 130, 140, 150) are referred to as base classes or super classes because their characteristics are inherited by another class, namely help desk policy class 110. It should be recognized that FIG. 1 is an illustration of multiple inheritance, as the derived help desk policy class 110 is inheriting the characteristics of more than one base class.

Through the derivation described above, the directory system may now make a determination that help desk policy class 110 is a policy class that is acceptable for WINDOWS 98™ systems, and for users, and that it is a policy class that may be scheduled. Such a determination may be made by examining the names of the base policy classes (120, 130, 140, 150) that help desk policy class 110 is derived from. Since the names of the base policy classes (120, 130, 140, 150) are well known and constant, and because help desk policy class 110 is derived from these base policy classes, the system is able to make this determination about the help desk policy class 110 and any eventual instances of the help desk policy class 110 that may be created.

Those skilled in the art will realize that policy classes (110, 120, 130, 140, 150) are but a few representative examples of policy classes that may be created to manage resources of a computer system such as users, workstations, or servers. These policy classes may also apply to various operating systems and may be capable of supporting various features.

One drawback associated with using hierarchical database structures is that derivation is generally a one-time process. In other words, when an administrator or other individual creates a new subclass that is to be derived from a base class, he or she may be limited in the future to only those attributes that were included in the class definition of the new subclass at the time of creation.

In FIG. 1, for example, help desk policy class 110 was derived from policy classes (110, 120, 130, 140, 150) and was defined to include any new attributes along with the attributes that were inherited from policy classes (110, 120, 130, 140, 150). If a network administrator, in the course of organizing or managing objects or instances of classes, later discovers that help desk policy class 110 shares the structure and behavior of some other existing base class (not shown), it may be disadvantageous for the help desk policy class 110 to derive from this newly discovered base class. If the help desk policy class 110 is allowed to derive from the newly discovered base class, any subsequent objects or instances of the help desk policy class 110 created would conflict with objects or instances of the help desk policy class 110 already in existence. The network administrator would most likely be forced to create a new help desk policy class and re-create all of the old objects already in existence.

The inability to modify a class schema by adding attributes later may result in an inflexible and inefficient system. These and other drawbacks exist. For this reason, it may be valuable for network administrators managing classes in a directory to be able to determine the user interface and behavior of a class before any objects or instances of the class are created in the directory. In addition, it may valuable for network administrators to understand how different classes relate to one another before any objects or instances of the classes are created in the directory.

SUMMARY OF THE INVENTION

The invention solving these and other problems in the art relates to a system and method for using schema attributes as meta-data in a directory service.

According to an embodiment of the invention, a directory service may be used with a computer system or network to aid in storing and managing data or other information relating to the system. Prior to creating an object class in a directory service, various data or other information pertaining to one or more network resources in a computer system may be identified. A group of attributes that will be used to describe this data may be given special names or menacingly the individual creating the class. These attributes may then be included in the class schema. After a class has been created, users having appropriate access rights may then create objects or instances of the class in the directory.

One advantage of this embodiment is that the user interface and behavior of a class may be determined before any objects or instances of the class ever exist in the directory. This may be accomplished by reading the class schema and identifying the attributes which exist in the schema that have been given special meaning.

Another advantage of this embodiment is that additional attributes may be added to the class schema if the meaning or use of the class has changed, or if any additional attributes are needed to describe how the class should behave.

According to one embodiment of the invention, a directory system may define or determine relationships between various classes in the directory via a specially named relationship class. First, at least two classes in a directory that share some type of relationship may be identified. A name that appropriately identifies the relationship between the at least two classes may be selected, and then a relationship class having the selected name may be created in the distributed directory. The relationship class may have an attribute that is specially named to indicate that its multiple values may include the names of the classes participating in the relationship. When the relationship class is created, however, no values may be assigned to the attribute. Rather, values for the attribute may be assigned in an object or instance of the relationship class, after the object or instance of the relationship class is created in the directory. Once an object or instance of the relationship class is created in the directory, the directory system may search the directory tree to locate the instance of the relationship class. Upon finding this object in the tree, the directory system may read the value of the attribute to discover the names of the classes that participate in the relationship.

One advantage of this embodiment is that more than one object or instance of the relationship class may be created in the directory, allowing for customization in different segments of the directory tree. Customization may be advantageous because, for example, relationships between classes may be different for different subtrees of the directory.

Another advantage of this embodiment is that the values of the attribute in the instance of the relationship class may be modified if the relationship between classes (identified by the relationship class and its object) has changed.

According to one embodiment of the invention, a directory system may define or determine several relationships between various classes in the directory via a general relationship class. First, various relationships between classes in a directory may be identified. Names that appropriately identify these relationships between classes may be selected. Next, a general relationship class may be created in the directory, having a first attribute and a second attribute. When the general relationship class is created, however, neither of the attributes may be assigned any values. Rather, values for these attributes may be assigned in an object or instance of the general relationship class once the object or instance is created in the directory. Various value fields for the first attribute may include the names that were created to define the various types of relationships that may exist between classes in a directory. The names of classes that participate in the relationships named in the value fields of the first attribute may then be assigned to corresponding value fields in the second attribute. Once an object or instance of the general relationship class is created in the directory, the directory system may search the directory tree to locate an instance of the general relationship class. Upon finding this object in the tree, the directory system may read the value fields of the first attribute to discover the various relationships that are represented. Next, the directory system may read the corresponding value fields for the second attribute to find the names of the classes that are participating in the respective relationships.

One advantage of this embodiment is that more than one object or instance of the general relationship class may be created in the directory, allowing for customization in different segments of the directory tree. Customization may be advantageous because, for example, relationships between classes may be different for different subtrees of the directory.

Another advantage of this embodiment is that the values of the attribute in the instance of the general relationship class may be modified if the various types of relationships between the classes have changed, as well as whether the names of any classes participating in the relationships have changed.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF PREFERRED EMBODIMENTS

Figure 1:
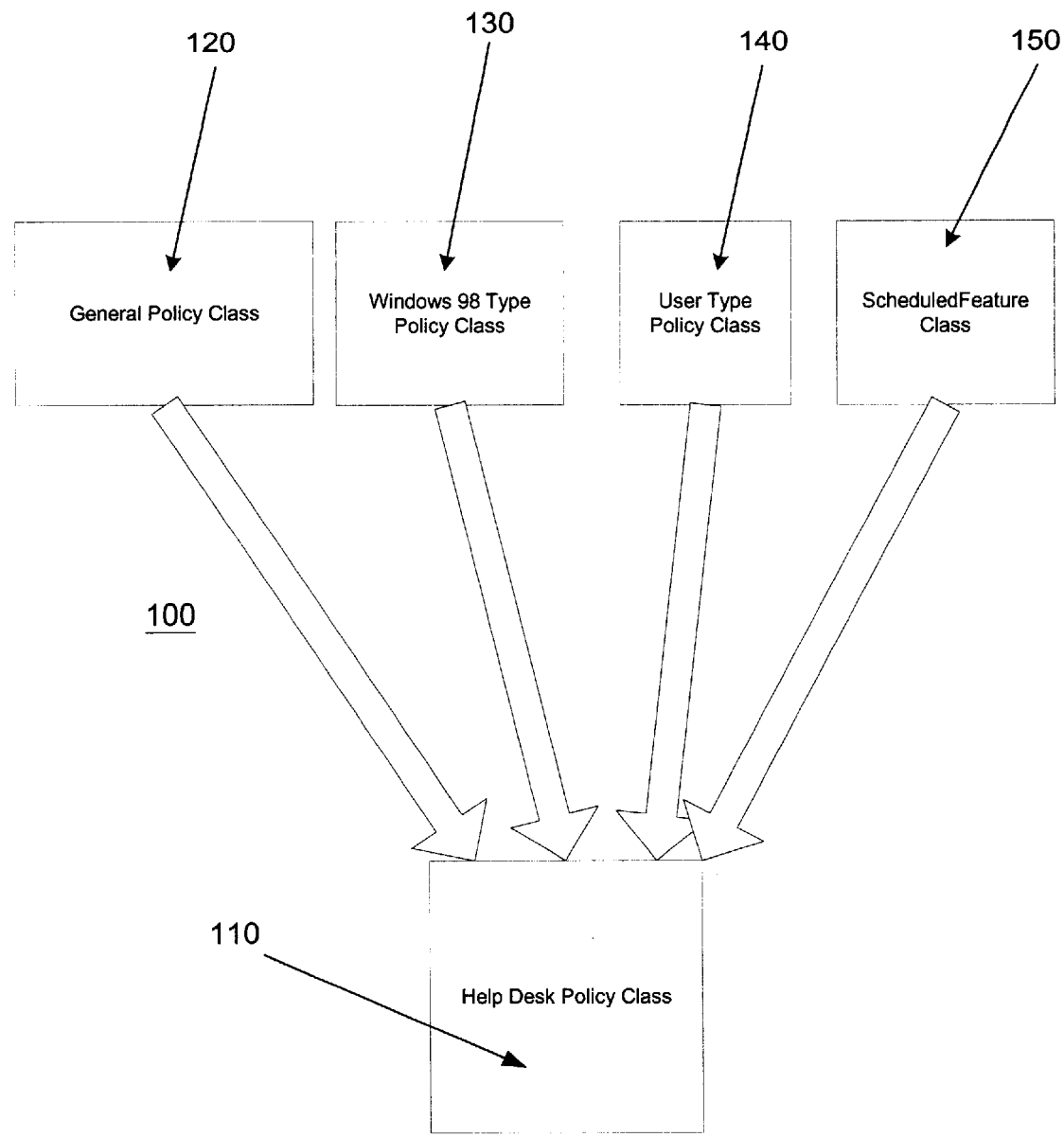
FIG. 1 illustrates a distributed directory having a hierarchical database structure.
Figure 2:
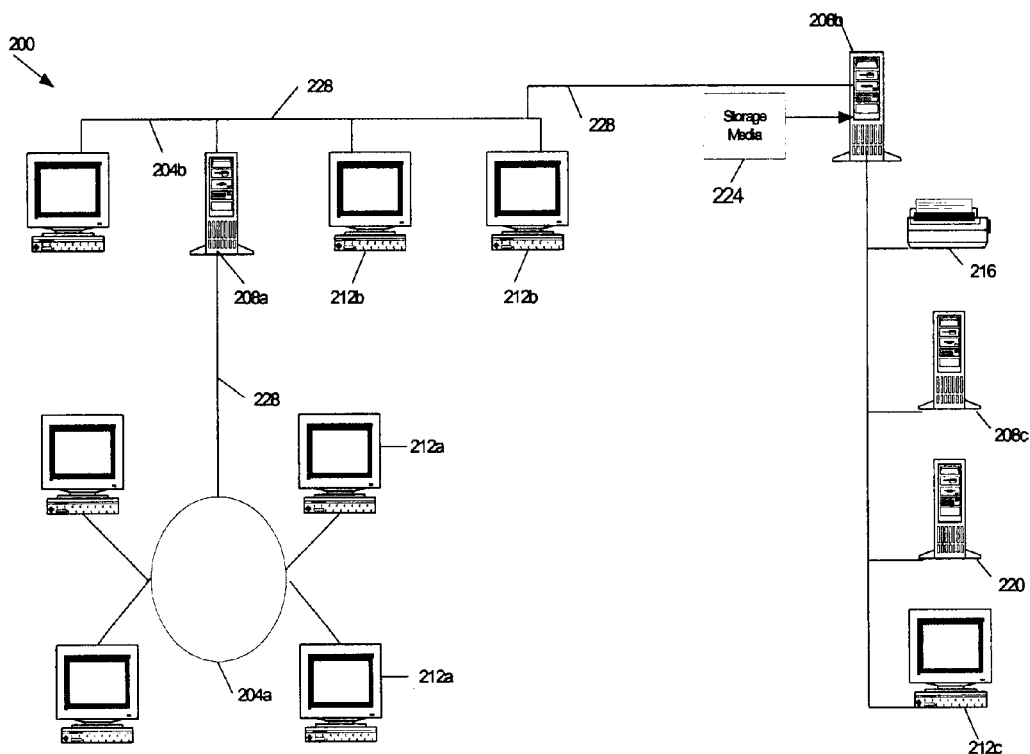
FIG. 2 is a schematic block diagram of a system of networked computers in accordance with an embodiment of the invention.

A directory service using a hierarchical database structure may be used to store and maintain data relating to various resources comprising a networked computer system 200, as illustrated in FIG. 2.

System 200 may comprise one or more networks 204 (e.g. networks 204a, 204b, 204c) that may be, or include any one or more of, for instance, the Internet, an intranet, a PAN (Personal Area Network), a LAN (Local Area Network), a WAN (Wide Area Network), a SAN (Storage Area Network), or a MAN (Metropolitan Area Network). One or more network clients 212 (e.g. clients 212a, 212b, 212c) may also comprise system 200. Each network client 212 may access files or applications, as well as other functions or data structures provided by one or more servers 208 (e.g. servers 208a, 208b, 208c) via communications links 228. Examples of network clients 212 may include any one or more of, for example, personal computers, portable computers, workstations, or dumb terminals. Suitable servers 208 may be configured as Internet servers, intranet servers, software component servers, directory service providers or name servers, or as any combination thereof. A network client 212 may function as both a client and a server. Communications links 228 may be, or include any one or more of, for instance, a telephone line, a digital T1, T3, E1, or E3 line, Digital Data Service (DDS) connection, Digital Subscriber Line (DSL) connection, an Ethernet connection, an ISDN (Integrated Services Digital Network) line, a dial-up port such as V.90, V.34 or V.34bis analog modem connection, a cable modem, or other wired or wireless data connections known to those having skill in the art.

Both the servers 208 and network clients 212 may include one or more of an addressable storage medium such as random access memory, or an optical or magnetic disk. The servers 208 and network clients 212 may also use floppy drives, optical drives, tape drives, or other drives to read a storage medium 224. Examples of suitable storage mediums may include, for instance, a magnetic, optical, or other device having a specific physical substrate configuration. Floppy disks, hard disks, tape, CD-ROM's, PROM's, and RAM may be considered a non-exhaustive list of suitable storage devices. Various devices including printers 216, and storage devices 220, for example, may also comprise system 200. Those of skill in the art will appreciate that the invention works with various system configurations. Accordingly, more or less of the aforementioned system components may be used in various embodiments.

In an embodiment of the invention, a directory service may be used with system 200 as described above, to aid in storing and managing data or other information relating to the system. Suitable directory services may preferably be those having a hierarchical database structure, such as, for example, NetWare Directory Services™ ("NDS") by Novell Corporation. Directory services with a hierarchical database structure may be preferred as they generally allow network administrators to create classes in a directory schema, and subsequently allow users with appropriate access rights to create objects or instances of the class, which may be added to the distributed directory.

Figure 3:
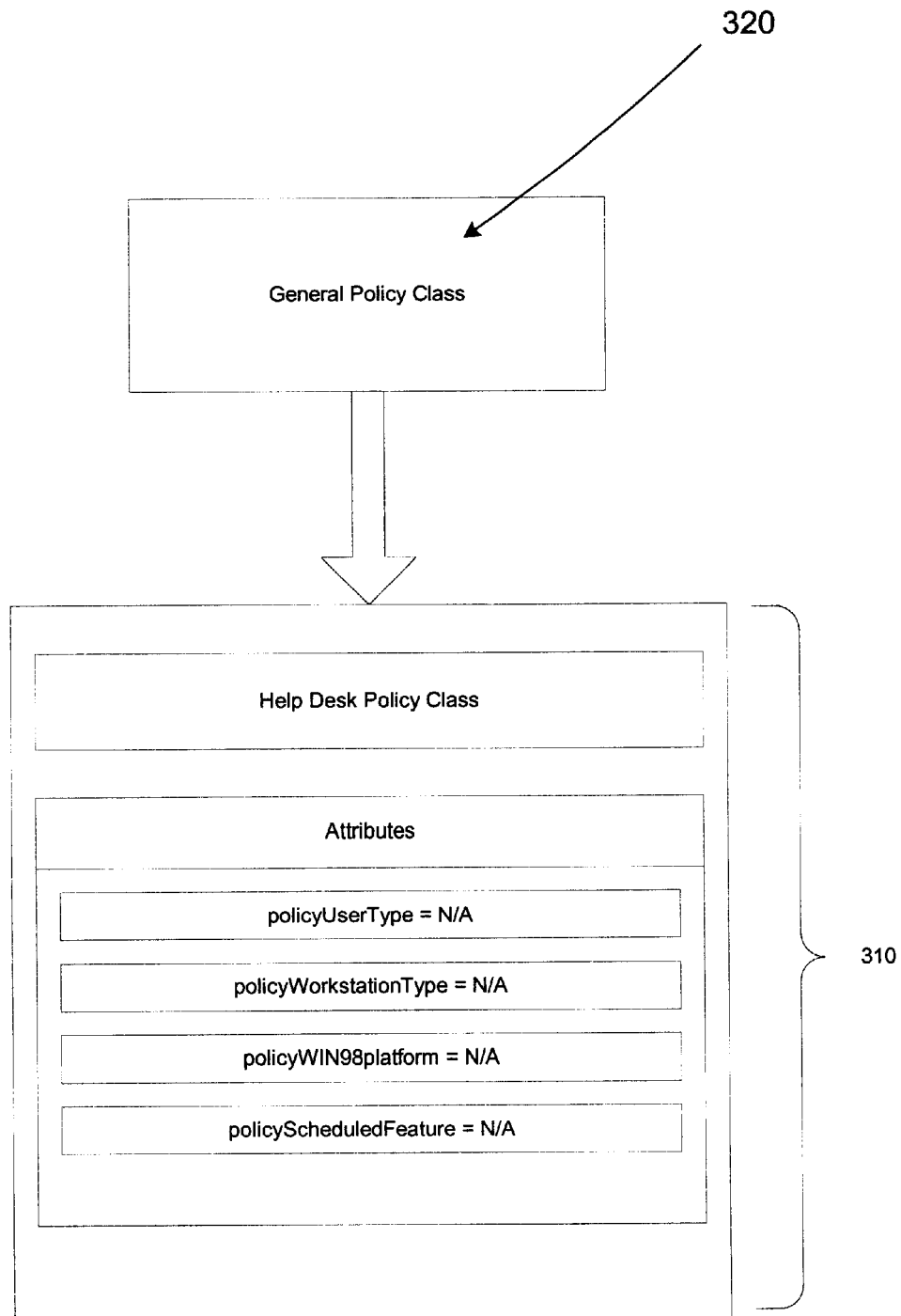
FIG. 3 illustrates an example of a class schema, according to an embodiment of the invention.

FIG. 3 illustrates an embodiment of the invention which overcomes the drawbacks associated with inheritance and derivation by enabling a directory system to determine relationships between various classes by using specially named attributes. In FIG. 3, an example of a schema for a help desk policy class 310 is shown. This policy class may be derived from (or based on the declaration of) a general policy class 320. General policy class 320 may contain attributes generic to all policy classes. It should be recognized that help desk policy class 310 and general policy class 320 have been selected for illustrative purposes, and are but two examples of many various types of classes that may exist in a directory system. Accordingly, the scope of the invention should not be limited by the following description.

According to the invention, when a network administrator or other individual decides to create the help desk policy class 310, he or she may first select and name one or more attributes to describe the help desk policy.

For example, a network administrator may first name the attributes that describe what types of objects the help desk policy class 310 may manage. If, for instance, the help desk policy may be used to manage users, an attribute named "policyusertype" may be created. Likewise, if the policy may be used to manage workstations, an attribute named "policyworkstationtype" may be created.

Next, a network administrator may name the attributes that describe what particular platforms the help desk policy may apply to. For example, if the help desk policy applies to the WINDOWS 98™ platform, an attribute having the name "policyWIN98platform," may be created.

Additionally, attributes having special names may be created for the help desk policy class if it can support different features. For example, if a help desk policy can be scheduled, it may be given a name such as "policyScheduledfeature."

Any number of attributes may be created and assigned a special name or meaning. The names assigned to the attribute may be expressed in any number of ways according to any number of various conventions, including those unique to the directory service or to the computer system that the directory service is managing. Once a group of attributes have been named, the help desk policy class 310 may be created in the distributed directory including those attributes that describe how the class should behave. The class may, as described above, derive generic attributes relating to policies from general policy class 320. While creating the help desk policy class, any number of attributes that have been named may be added to the class schema.

After a network administrator has created the class, users having appropriate access rights may then create objects based on that class. These objects, also referred to as instances of the class, are then entered into the distributed directory. Upon creation, the instances or objects of the help desk policy class 310 may include each of the attributes that were added to the schema of help desk policy class 310, even though they may go unused.

One of the benefits of using attributes, is that more attributes may be named and added to the class schema at a later time. If for instance, a network administrator learns that the help desk policy class may also manage servers, an attribute named "policyServertype" may be added to the class schema which already includes the attributes named "policyusertype" and "policyWorkstationtype."

Similarly, if it is later determined that the help desk policy class may also apply to the WINDOWS NT™ platform, WINDOWS 95™ platform, or WINDOWS 2000™ platform, attributes named "policyWINNTplatform," "policyWIN95platform," and "policyWIN2000platform" may be created and subsequently added to the class schema. The same applies to any additional features or other properties that a class may affect. The invention allows more attributes to be added to further describe a class when its meaning or use has changed.

One of the advantages of the invention is that the attributes which are given special meaning and defined in the class schema may serve as meta-data. By reading the schema of a class, the directory system may ascertain what the class relates to even before any objects or instances of the class exist in the directory.

Referring back to FIG. 3, a network administrator may, for example, be responsible for managing various policies created by other network administrators. Assume, for instance, that a network administrator wishes to create a list of all of the possible policies that apply to workstations. Before any instances of these policy classes exist in the directory, the directory system may read the schemas of each of the policy classes. For each class, a first determination may be made as to whether or not the class in question was derived from the general policy class 320. If a class was derived from the general policy class 320, the network administrator may know that the class is a policy class and should be examined further to determine whether or not the attribute "policyWorkstationtype" exists in the schema. If it does exist in the class schema, the network administrator will know that the policy may apply to workstations, and can list it accordingly.

In addition to scanning, searching, reading, or examining multiple class schemas for a particular attribute in order to identify class relationships, it is of course possible to scan, search, read, or examine the schema of one class to identify relationships. For example, the directory system may read the schema of the help desk policy class 310, as illustrated in FIG. 3. Because the attributes named "policyUsertype," "policyWorkstationtype," and "policyWIN98platform," exist in the schema for the help desk policy class 310, the directory system may assume that the help desk policy may be used with users and workstations running WINDOWS 98™ platforms. In addition, because an attribute named "policyScheduledfeature" also exists in the class schema, the system may know that it should include scheduling code and features.

In the foregoing description, attributes concerning objects, platforms, and features were described with reference to policy classes. Those skilled in the art will understand that any types of attributes may be given special meaning to describe the user interface or behavior of any types of classes that may need to be created.

Figure 4:
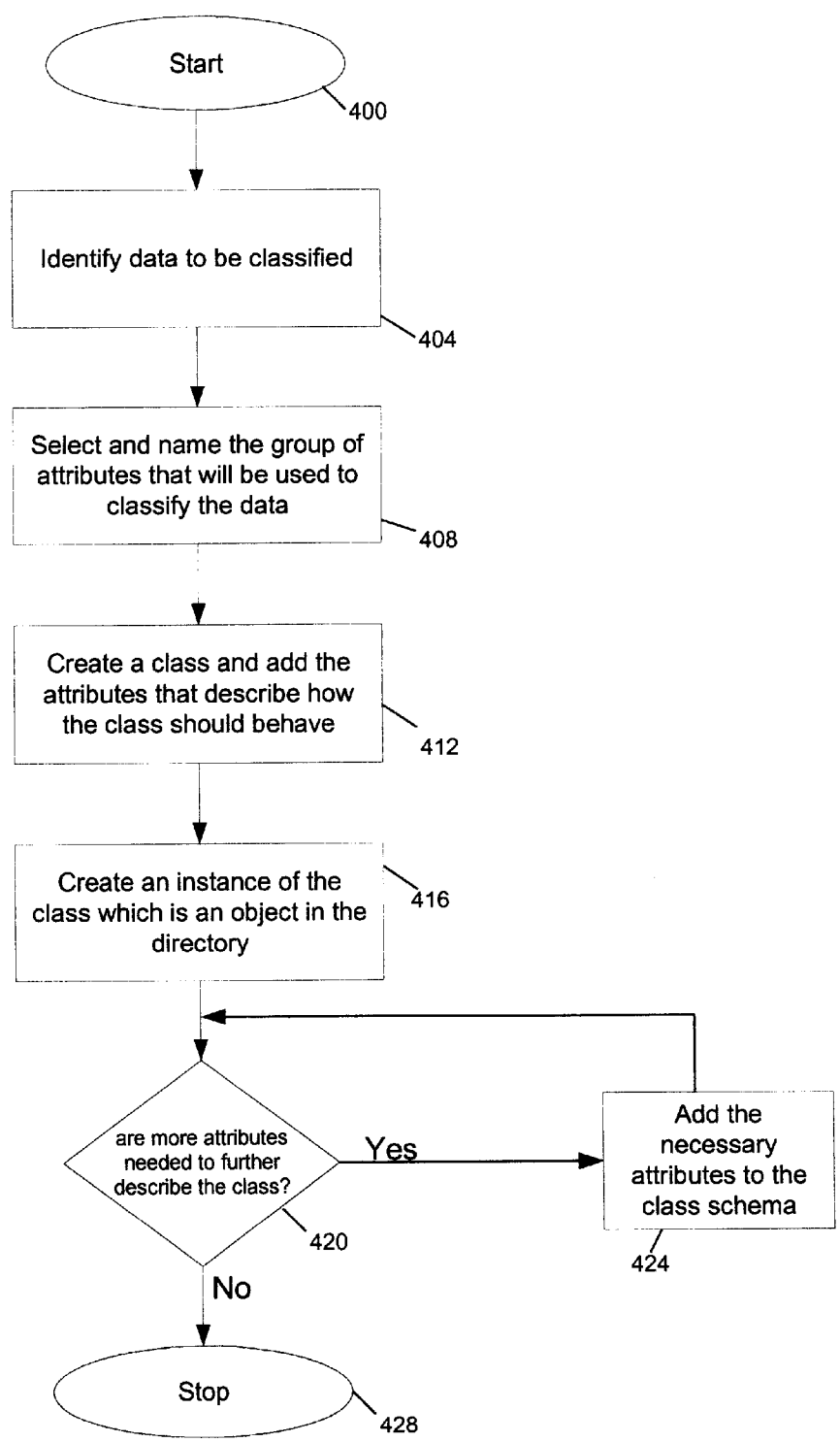
FIG. 4 illustrates a process for creating a class in a directory, according to an embodiment of the invention.

FIG. 4 illustrates a flowchart for creating a class in a distributed directory according to the invention, in one regard. Processing may begin at step 400. In step 404, a network administrator or other individual may identify various data or other information pertaining to one or more network resources that may need to be classified. The network administrator may then, in step 408, select and name the group of attributes that will be used to classify the data. The attributes may, for example, describe what type of objects a class may manage, what platforms a class may apply to, and, among others, what features a class may support. The names assigned to the various attributes may be expressed in any number of ways according to any number of various conventions. In step 412, a class may be created in the distributed directory including those attributes that describe how the class should behave. After a class has been created, users having appropriate access rights may then create objects based on that class in step 416. These objects, which may also be referred to as instances of the class, may then be entered into the distributed directory. In step 420, an inquiry is made to determine whether or not the meaning or use of the class has changed, or if any additional attributes are needed to describe how the class should behave. If a network administrator needs to add more attributes to the class schema, he or she may do so as seen in step 424. If no further attributes are needed, processing may end at step 428.

Figure 5:
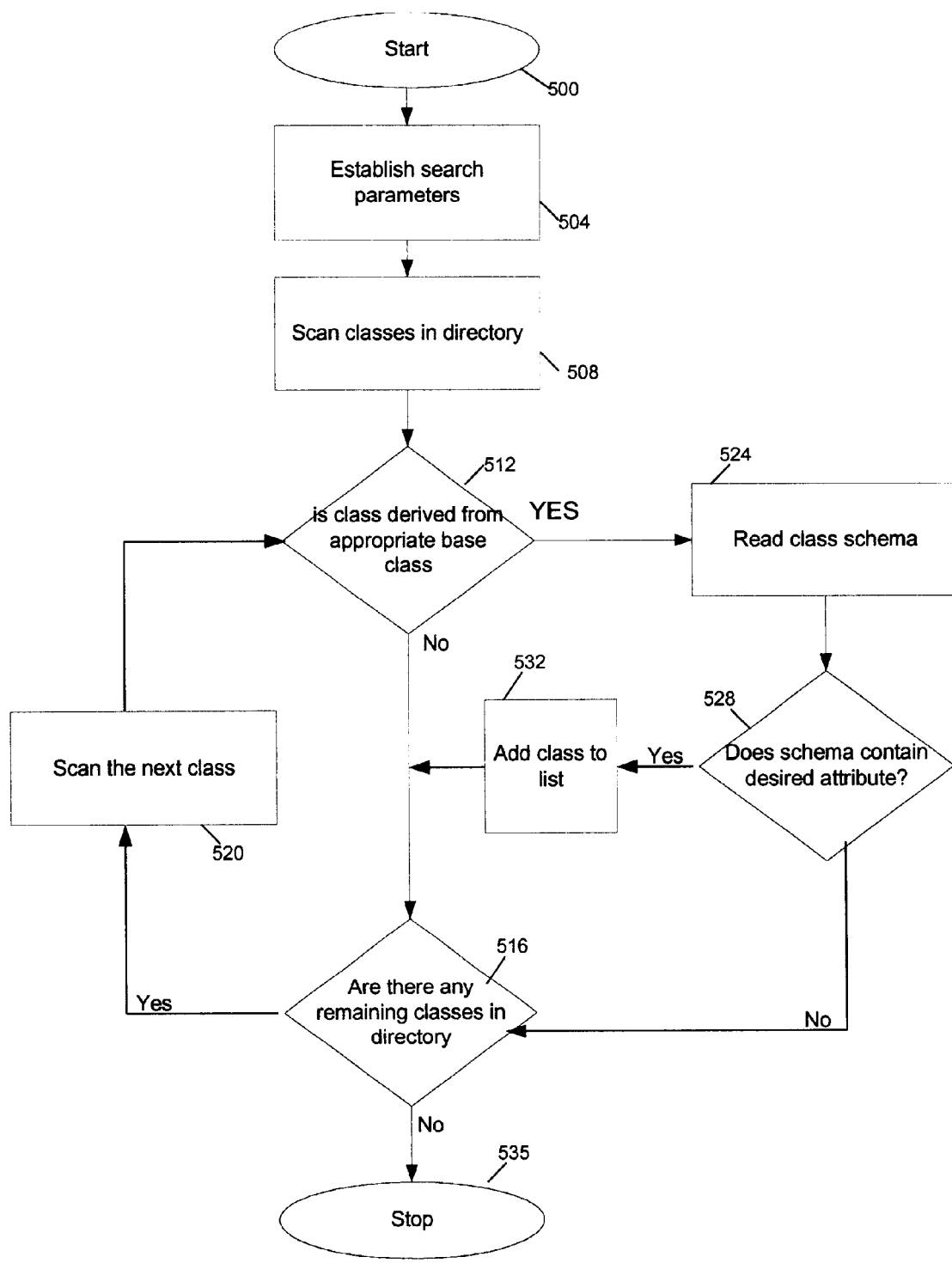
FIG. 5 illustrates a process for reading a class schema, according to an embodiment of the invention.

FIG. 5 illustrates a flowchart for reading a class schema according to the invention, in one regard. Processing may begin at step 500. In step 504, a network administrator may identify what types of classes he or she is trying to obtain information about. For example, a network administrator may wish to create a list of all policies that apply to workstations, or apply to Windows NT™, or may be scheduled. Once the criteria has been decided, the directory system may scan, search, or perform a query on the classes in the directory in step 508. For each particular class identified as a result of the search, scan, or query, an inquiry may be made in step 512 to determine whether or not the class has been derived from a relevant base class. In other words, if it is only desired to evaluate the policy classes in the directory, a determination may be made to see if the class has been derived from the general policy class. If the class has not been derived from the appropriate base class, a second inquiry may be made in step 516 to determine whether or not there are any remaining classes in the directory. If there are, the next class may be evaluated in step 520 with processing then proceeding back to step 512.

If a determination is made in step 512 that the class has been derived from the desired base class, the schema of the class may be read in step 524. An inquiry may then be made in step 528 to determine whether or not the class schema includes the desired attribute. Again, if the directory system is trying to locate, for example, all of the policies that apply to workstations, the class schema may be read to determine whether or not the attribute "policyworkstationtype" is present. If the desired attribute is discovered in the class schema, the directory system may note in step 532 that that policy applies to workstations. If the class schema does not contain the desired attribute, processing may proceed with step 516. Once all of the classes of the directory have been evaluated, processing may end at step 536.

The foregoing description of FIGS. 3–5 illustrates how a directory system may determine relationships between various classes by using specially named attributes in a class.

Figure 6A:
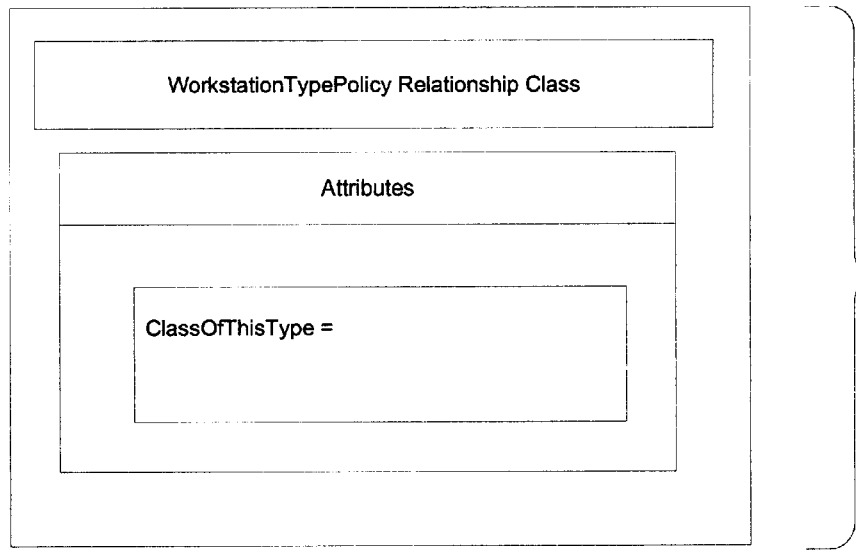
FIGS. 6A–6B illustrate an example of a relationship class and an instance of a relationship class created in a directory, respectively, according to an embodiment of the invention.
Figure 6B:
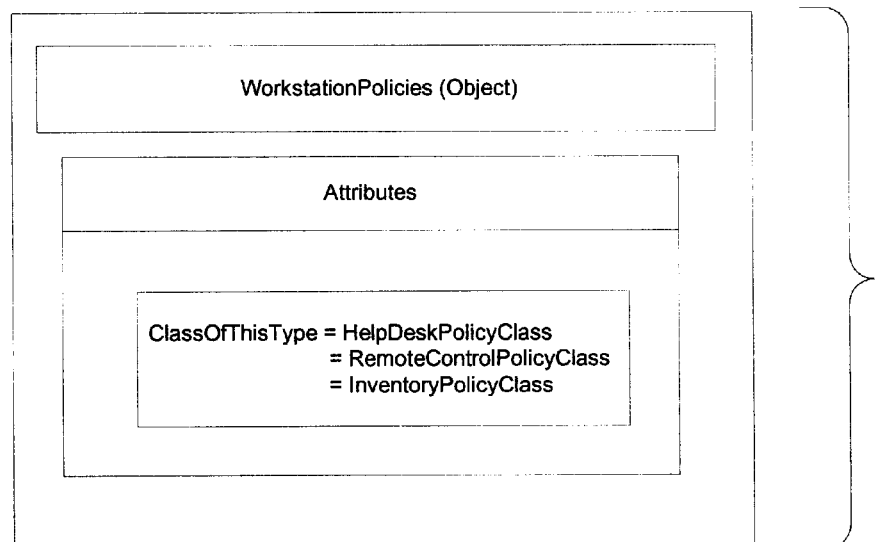

In an embodiment of the invention illustrated in FIGS. 6A–6B, a directory system may determine relationships between various classes by using a specially named relationship class. For ease of explanation, assume that a directory includes classes relating to workstations, as well as classes relating to different policies that may be used to manage workstations. A network administrator may, for administrative or other purposes, wish to create a relationship class named, for example, "WorkstationTypePolicy" to identify classes that apply to workstations.

FIG. 6A illustrates an example of a schema for a "WorkstationTypePolicy" relationship class 610 that may be created. The relationship class schema may include an attribute named, for instance, "ClassOfThisType." When "WorkstationTypePolicy" relationship class 610 is created, however, no values may be assigned to the "ClassOfThisType" attribute. Rather, values for the "ClassOfThisType" attribute may be assigned in an object or instance of the "WorkstationTypePolicy" relationship class 610, once the object or instance of the "WorkstationTypePolicy" relationship class 610 is created in the directory.

FIG. 6B depicts an example of an object or instance of the "WorkstationTypePolicy" relationship class 610 that may be created in the directory and given a name, such as, for example, "WorkstationPolicies." Once "WorkstationPolicies" object 620 is created, names of policy classes or other classes that apply to workstations may be assigned as values for the "ClassofThisType" attribute in "WorkstationPolicies" object 620. For example, if a help desk policy, remote control policy, and inventory policy may each be used to manage workstations, then "HelpDeskPolicyClass," "RemoteControlPolicyClass," and "InventoryPolicyClass" may all be assigned as values for the "ClassOfThisType" attribute in "WorkstationPolicies" object 620.

In an embodiment of the invention, more than one object or instance of the "WorkstationTypePolicy" relationship class 610 may exist in the directory, allowing for customization in different segments of the directory tree. Customization may be advantageous because, for example, the set of policies related to workstations may be different for different subtrees of the directory.

Additionally, the use of a relationship class allows for the relationships between classes to be modified over time, as there may be no restriction on adding or removing values from the "ClassOfThisType" attribute in "WorkstationPolicies" object 620. Accordingly, a network administrator or other individual may be afforded greater control when defining relationships between various classes.

After the "WorkstationPolicies" object 620 is created in the directory, the directory system may search (or perform a directed query of) the directory tree to locate an instance of the "WorkstationTypePolicy" relationship class 610 named "WorkstationPolicies." Upon finding this object 620 in the tree, the directory system may read the value of the "ClassOfThisType" attribute to discover the names of the classes that participate in the relationship.

Although this embodiment has been described with respect to a relationship class based on workstation classes and policy classes, it should be recognized that a relationship class may define associations or relationships among classes of any type that may be related to other classes. For example, a relationship class named "UserTypePolicy" relationship class may be created to define a relationship between user classes and policy classes that manage users.

Figure 7:
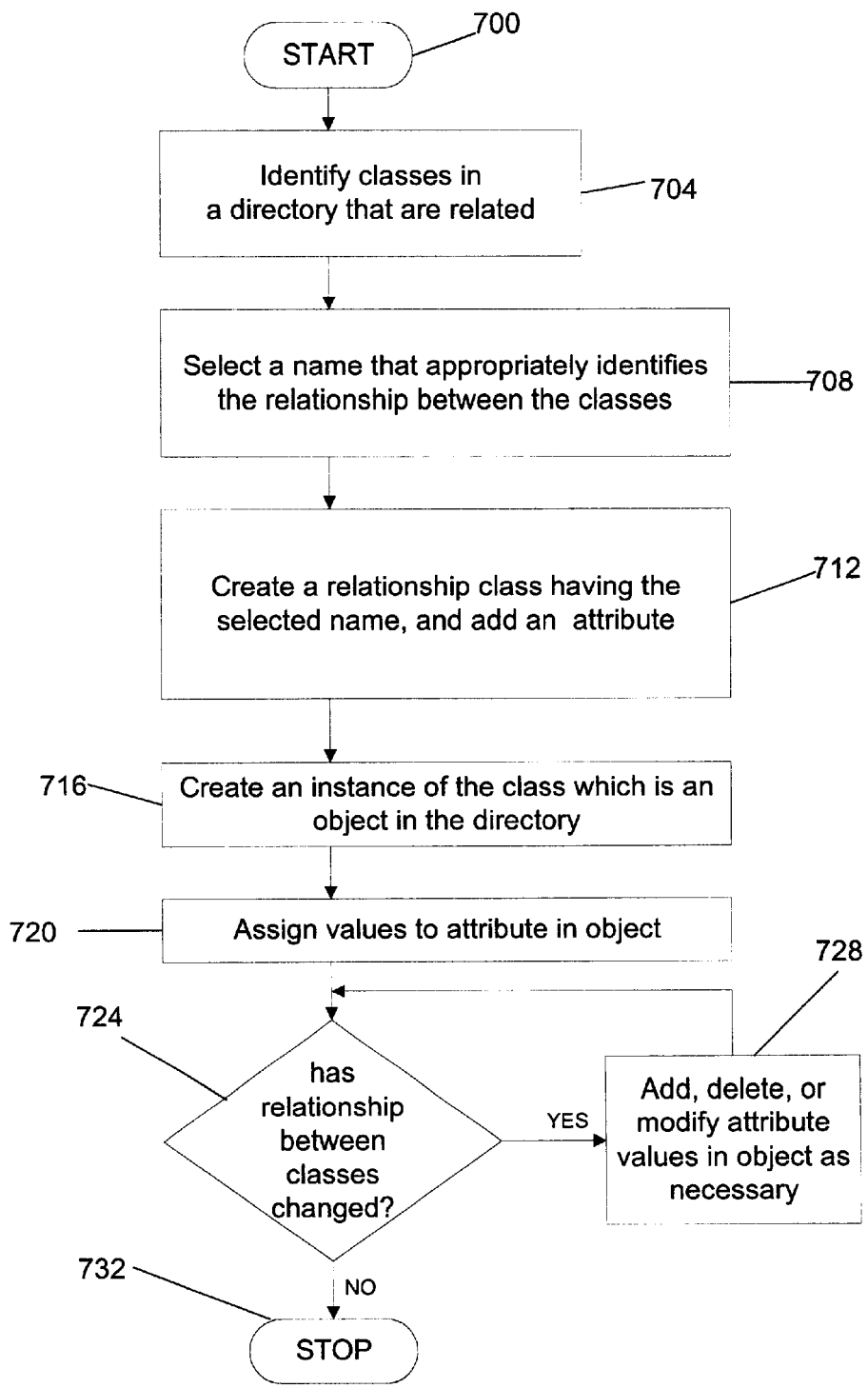
FIG. 7 illustrates a process for creating a relationship class in a directory, according to an embodiment of the invention.

FIG. 7 illustrates a flowchart for creating a relationship class in a distributed directory according to the invention, in one regard. Processing may begin at step 700. In step 704, a network administrator or other individual may identify at least two classes in a directory which are related. The network administrator may then, in step 708, select a name that appropriately identifies the relationship between the at least two classes. In step 712, a relationship class having the selected name may be created in the distributed directory. The relationship class may have an attribute that is specially named to indicate that its multiple values may include the names of the classes participating in the relationship. However, when the relationship class is created, no values may be assigned to the attribute. Rather, values for the attribute may be assigned in an object or instance of the relationship class, after the object or instance of the relationship class is created in the directory, which may occur at step 716. Typically, objects based on the relationship class may be created by users having appropriate access rights. These objects may also have a specially selected name. Step 720 illustrates the step of assigning the values for the attribute in an object or instance of the relationship class, after the object or instance of the relationship class is created in the directory.

Although not illustrated, more than one object or instance of the relationship class may be created in the directory in step 716, allowing for customization in different segments of the directory tree. Customization may be advantageous because, for example, relationships between classes may be different for different subtrees of the directory.

In step 724, an inquiry may be made to determine whether the relationship between classes (identified by the relationship class and its object) has changed. If a determination is made that the relationship has changed, values may, in step 728, be modified, added to, or deleted from the values of the attribute that were first included in the instance of the relationship class in step 720. If the relationship has not changed, processing may end at step 732.

Once an object or instance of the relationship class is created in the directory according to the process described above, the directory system may search (or perform a directed query of) the directory tree to locate an instance of the relationship class. Upon finding this object in the tree, the directory system may read the value of the attribute to discover the names of the classes that participate in the relationship.

The foregoing description of FIGS. 6A, 6B, and 7 illustrate how a directory system may determine relationships between various classes by using a specially named relationship class. A specially named relationship class may be created for each type of relationship that may exist.

In an embodiment of the invention, a general relationship class may be used to define or determine several types of relationships that may exist between classes in a directory. For illustrative purposes, assume that a directory includes classes relating to workstations, users, and features that may be scheduled, along with policy classes that may be used to manage each. Rather than creating a relationship class to define relationships between user classes and policy classes that manage users, and creating a relationship class to define relationships between workstation classes and policy classes that manage workstations, a single general relationship class may be created to define both relationships.

Figure 8A:
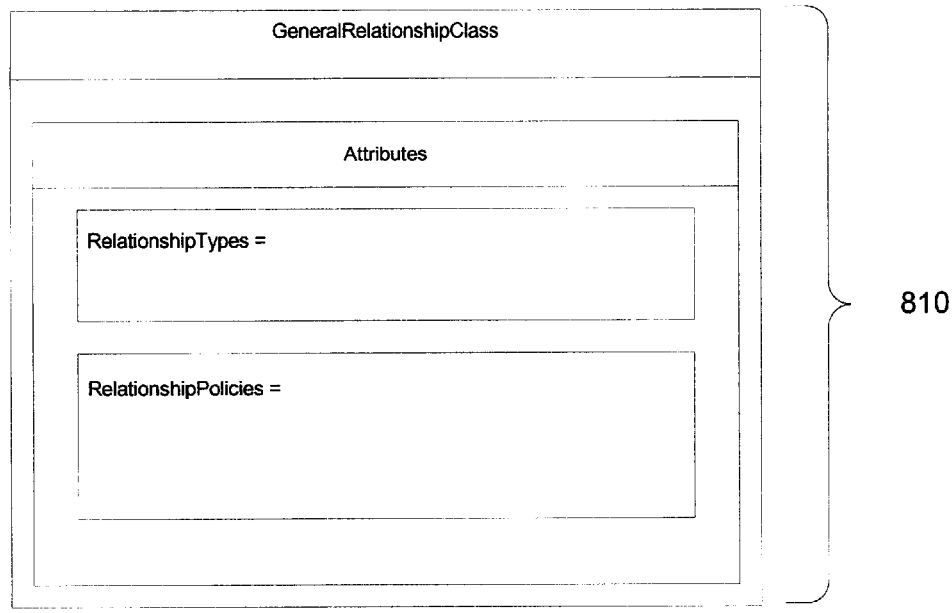
FIGS. 8A–8B illustrate an example of a general relationship class and an instance of a general relationship class in a directory, respectively, according to an embodiment of the invention.

FIG. 8A illustrates an example of a schema for a general relationship class 810 that may be created and assigned a name, such as "GeneralRelationshipClass." The schema of the general relationship class 810 may comprise a first attribute named, for example, "RelationshipTypes," and a second attribute named, for example, "RelationshipPolicies." When the general relationship class 810 is created, neither the "RelationshipTypes" attribute, nor the "RelationshipPolicies" attribute may be assigned values. Rather, values for these attributes may be assigned in an object or instance of the general relationship class 810, once the object or instance is created in the directory.

Figure 8B:
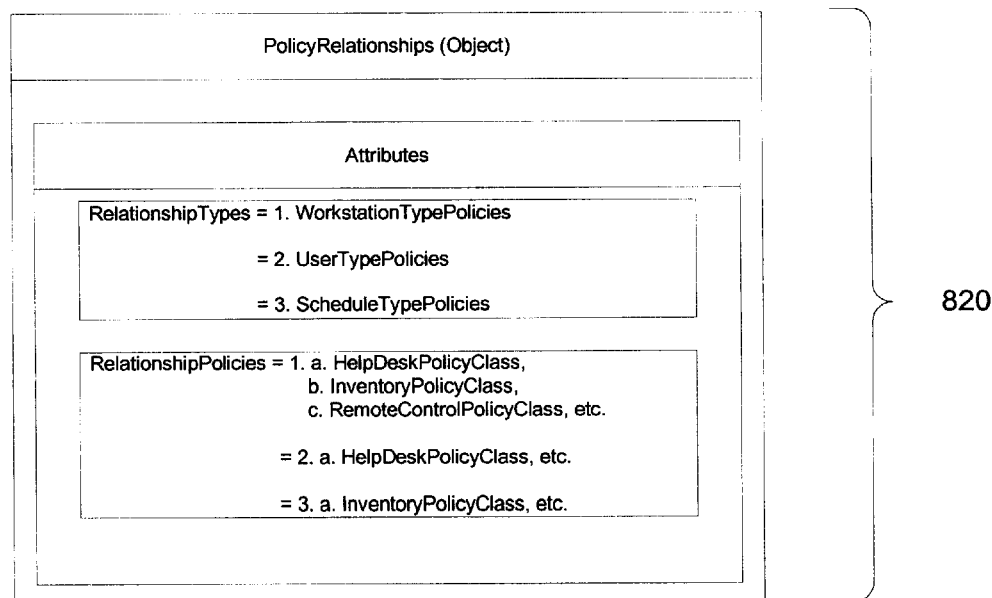

An example of an object or instance of general relationship class 810 that may be created in the directory is illustrated in FIG. 8B. When the object or instance is created, it may be given a name, such as, for example, "PolicyRelationships." Once the "PolicyRelationships" object 820 is created, values for the "RelationshipTypes" and "RelationshipPolicies" attributes may be entered in object 820.

Values for the "RelationshipTypes" attribute may include names that were created to define various types of relationships that may exist between classes in a directory. For example, if a network administrator is aware that the directory comprises policy classes that relate to workstations, users, and features that may be scheduled, he or she may assign the "RelationshipTypes" attribute values including "WorkstationTypePolicies," "UserTypePolicies," and "ScheduleTypePolicies," respectively. Values may then be assigned to the "RelationshipPolicies" attribute that correspond to the values assigned in the "RelationshipTypes" attribute. For example, in FIG. 8B, the first value field for the "RelationshipTypes" attribute is "WorkstationTypePolicies." Accordingly, the first value field for the "RelationshipPolicies" attribute may include the names of policy classes that are relevant to, or may be used to manage workstations. For instance, if a help desk policy, inventory policy, and remote control policy each may be used to manage workstations, then "HelpDeskPolicyClass," "InventoryPolicyClass," and "RemoteControlPolicyClass," may all be assigned as values in the first value field for the "RelationshipPolicies" attribute.

As an additional example, in FIG. 8B, the second value field for the "RelationshipTypes" attribute is "UserTypePolicies." Accordingly, the second value field for the "RelationshipPolicies" attribute may include the names of policy classes that are relevant to, or may be used to manage users. For instance, if a help desk policy may be used to manage users, then "HelpDeskPolicyClass," may; be entered as a values in the second value field for the "RelationshipPolicies" attribute.

In an embodiment of the invention, more than one object or instance of the general relationship class 810 may exist in the directory, allowing for customization in different segments of the directory tree. Customization may be advantageous because, for example, the set of policies related to, for example, users or workstations, may be different for different subtrees of the directory.

Additionally, the use of a general relationship class allows for the relationships between classes to be modified over time, as there may be no restriction on adding or removing values from the "RelationshipTypes" and "RelationshipPolicies" attributes in the "PolicyRelationships" object 820. Accordingly, a network administrator or other individual may be afforded greater control when defining relationships between various classes.

Once the "PolicyRelationships" object 820 is created in the directory, the directory system may search (or perform a directed query of) the directory tree to locate an instance of the "GeneralRelationshipClass" 810 named "PolicyRelationships." Upon finding this object 820 in the tree, the directory system may first read the value fields of the "RelationshipTypes" attribute to discover the various relationships that are represented. Next, the directory system may read the corresponding value fields for the "RelationshipPolicies" attribute to find the names of the classes that are participating in the respective relationships.

Again, it should be recognized that, although this embodiment has been described with respect to specific relationships for illustrative purposes, the general relationship class may be used to define associations or relationships among classes of any type that may be related to any other classes in a directory.

Figure 9:
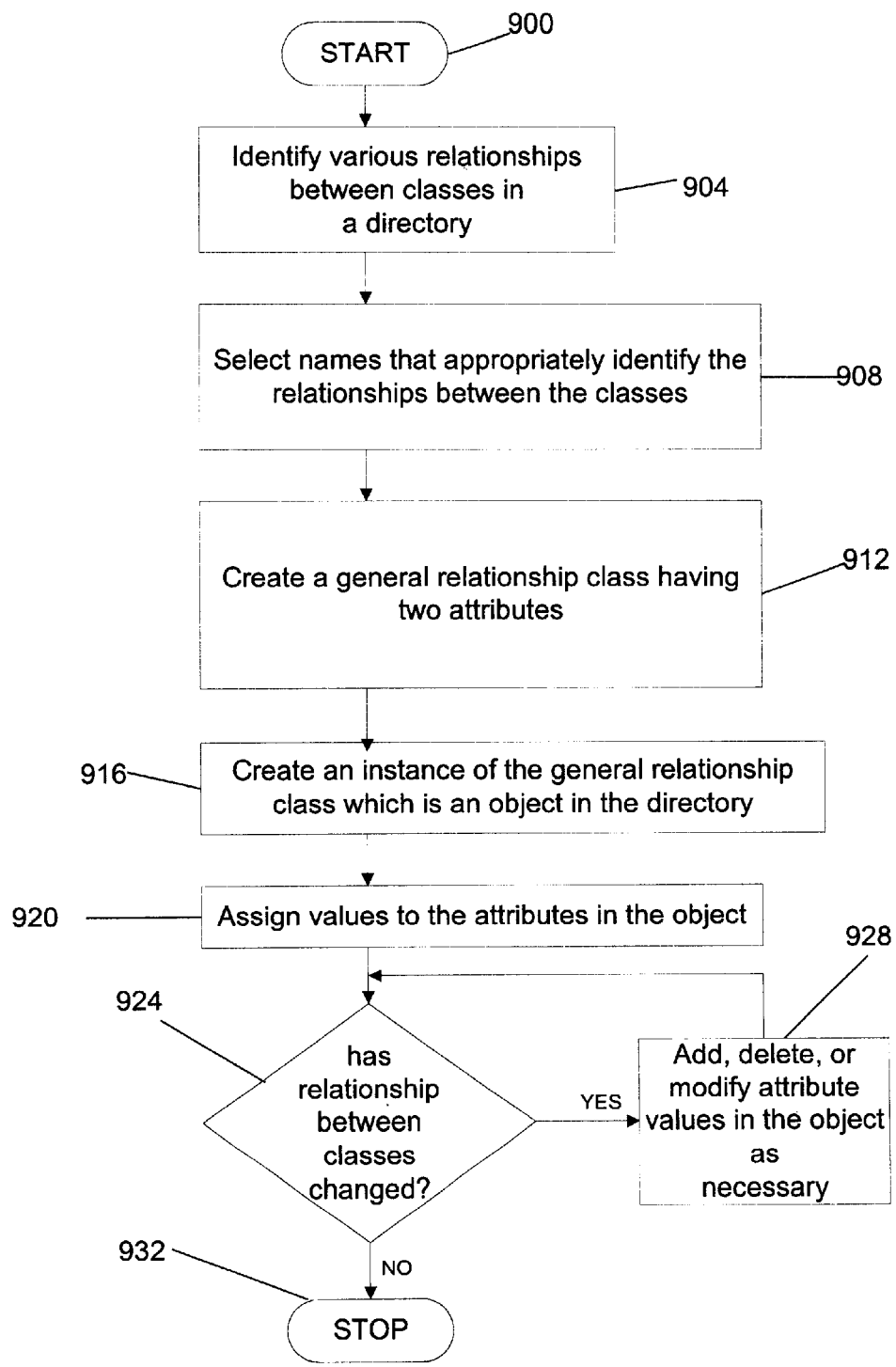
FIG. 9 illustrates a process for creating a general relationship class in a directory, according to an embodiment of the invention.

FIG. 9 illustrates a flowchart for creating a general relationship class in a distributed directory according to the invention, in one regard.

Processing may begin at step 900. In step 904, a network administrator or other individual may identify several types of relationships that may exist between classes in a directory. The network administrator may then, in step 908, select names that appropriately identify the relationship between the classes. In step 912, a general relationship class may be created in the distributed directory, and given a name such as, for example, "GeneralRelationshipClass." The general relationship class may have a first attribute and a second attribute. When the general relationship class is first created, however, neither of the attributes may be assigned any values. Rather, values for these attributes may be assigned in an object or instance of the general relationship class once the object or instance is created in the directory, which may occur at step 916. Typically, objects based on the relationship class may be created by users having appropriate access rights. These objects may also have a specially selected name.

Step 920 illustrates the step of assigning the values for the attribute in an object or instance of the relationship class, after the object or instance of the relationship class is created in the directory. Various value fields for the first attribute may include names that were created to define various types of relationships that may exist between classes in a directory. The names of classes that participate in the relationships named in the value fields of the first attribute may then be assigned to corresponding value fields in the second attribute.

Although not illustrated, more than one object or instance of the general relationship class may be created in the directory in step 916, allowing for customization in different segments of the directory tree. Customization may; be advantageous because, for example, relationships between classes may be different for different subtrees of the directory.

In step 924, an inquiry may be made to determine whether the various types of relationships that may exist between classes in a directory have changed, as well as whether the names of any classes participating in the relationships have changed. If a determination is made that either have changed, values may, in step 928, be modified, added to, or deleted from the value fields of the two attributes that were first defined in the instance of the general relationship class in step 920. If the relationship has not changed, processing may end at step 932.

Once an object or instance of the general relationship class is created in the directory according to the process described above, the directory system may search (or perform a directed query of) the directory tree to locate an instance of the general relationship class. Upon finding this object in the tree, the directory system may first read the value fields of the first attribute to discover the various relationships that are represented. Next, the directory system may read the corresponding value fields for the second attribute to find the names of the classes that are participating in the respective relationships.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. In a directory service system utilizing a database for managing resources of a computer network, a method for using attributes associated with a schema as meta-data, the method comprising the steps of:

deriving a class from at least one base class;

adding at least one attribute to the derived class, wherein the at least one attribute corresponds to one or more attributes associated with schema of one or more additional classes and wherein the one or more additional classes are different from the at least one base class;

selecting a name for the at least one attribute that describes content of the at least one attribute, wherein the name that is associated with the at least one attribute serves as meta-data for the derived class and wherein the directory service system is capable of defining the derived class based on the meta-data.

2. The method of claim 1, wherein the directory service system comprises a distributed directory.

3. The method of claim 1, wherein the database comprises a hierarchical database.

4. The method of claim 3, wherein the class derived from the at least one base class is located in the hierarchical database.

5. The method of claim 1, wherein the name associated with the at least one attribute describes a behavior of the derived class.

6. The method of claim 1, further comprising the step of:

generating in the database at least one instance of the derived class.

7. The method of claim 6, further comprising the step of:

adding new attributes to the schema of the derived class as needed to further describe the derived class.

8. The method of claim 7, further comprising the step of:

generating in the database at least one instance of the derived class based on the newly added attributes.

9. The method of claim 1, further comprising the steps of:

reading the schema of the derived class; and determining a behavior of the derived class before any instances of the derived class appear in the database.

10. A directory service system for using attributes associated with schema as meta-data, the system comprising:

a database for managing resources of a computer network, the database configured to operate so as to:

enable derivation of a class from at least one base class;

enable addition of at least one attribute to the derived class, wherein the at least one attribute corresponds to one or more attributes associated with schema of one or more additional classes and wherein the one or more additional classes are different from the at least one base class;

enable selection of a name for the at least one attribute that describes content of the at least one attribute, wherein the name that is associated with the at least one attribute serves as meta-data for the derived class and wherein the directory service system is capable of defining the derived class based on the meta-data.

11. The system of claim 10, wherein the directory service system comprises a distributed directory.

12. The system of claim 10, wherein the database comprises a hierarchical database.

13. The system of claim 12, wherein the class derived from the at least one base class is located in the hierarchical database.

14. The system of claim 10 wherein the name associated with the at least one attribute describes a behavior of the derived class.

15. The system of claim 10 wherein at least one instance of the derived class is generated in the database.

16. The system of claim 15, wherein new attributes are added to the schema of the derived class as needed to further describe the derived class.

17. The system of claim 16, wherein at least one instance of the derived class is generated in the database based on the newly added attributes in the schema.

18. The system of claim 10, wherein the schema of the derived class is read to determine a behavior of the derived class before any instances of the derived class appear in the database.

19. In a directory service system utilizing a database for managing resources of a computer network, a method for identifying relationships between entries in the database, the method comprising the steps of:

generating a relationship class in the database;

identifying two or more classes in the database that share at least one relationship;

selecting a class name for the relationship class, wherein the class name describes the relationship between the two or more classes;

providing at least one attribute for the relationship class;

selecting an attribute name for the at least one attribute, wherein the attribute name describes one or more values to be associated with the at least one attribute;

generating at least one instance of the relationship class; and assigning one or more values to a corresponding attribute of the at least one instance, wherein the one or more values include identifiers for the two or more classes that share the at least one relationship.

20. The method of claim 19 wherein the one or more values assigned to the corresponding attribute comprise names of classes that participate in the relationship.

21. The method of claim 19, further comprising the step of:

assigning an additional value to the corresponding attribute of the at least one instance when a new class is identified that participates in the relationship.

22. The method of claim 19 further comprising the step of:

removing an existing value from the corresponding attribute of the at least one instance when an existing class no longer participates in the relationship.

23. The method of claim 19 further comprising the steps of:

querying the directory to locate the at least one instance of the relationship class;

reading values assigned to the at least one attribute of the at least one instance to identify the two or more classes participating in the relationship.

24. The method of claim 19 further comprising the step of:

enabling generation of the at least one instance of the relationship class in two or more subtrees of the directory;

enabling a customization of the one or more values associated with the corresponding attribute so that each instance may be placed in a different subtree of the directory and may represent relationships between two or more different classes of the database.

25. A directory service system for identifying relationships between entries in a database, the system comprising:

the database for managing resources of a computer network, the database being configured to operate so as to:

generate a relationship class in the database;

identify two or more classes in the database that share at least one relationship;

select a class name for the relationship class, wherein the class name describes the relationship between the two or more classes;

provide at least one attribute for the relationship class;

select an attribute name for the at least one attribute, wherein the attribute name describes one or more values to be associated with the at least one attribute;

generate at least one instance of the relationship class in the directory; and assign one or more values to a corresponding attribute of the at least one instance, wherein the one or more values include identifiers for the two or more classes that share the at least one relationship.

26. The system of claim 25 wherein the database is further configured to assign one or more values to the corresponding attribute by assigning names of classes that participate in the relationship to the one or more values.

27. The system of claim 25, wherein the database is further configured to assign an additional value to the corresponding attribute of the at least one instance when a new class is identified that participates in the relationship.

28. The system of claim 25, wherein the database is further configured to remove an existing value from the corresponding attribute of the at least one instance when an existing class no longer participates in the relationship.

29. The system of claim 25, wherein the directory is further configured to query the database to locate the at least one instance of the relationship class, and to read values assigned to the at least one attribute of the at least one instance to identify two or more classes participating in the relationship.

30. The system of claim 25 wherein the database is further configured to:

enable generation of the at least one instance of the relationship class in two or more subtrees of the directory; and enable customization of the one or more values associated with the corresponding attribute so that each instance may be placed in a different subtree of the directory and may represent relationships between two or more different classes of the database.

31. In a directory service system utilizing a database for managing resources of a computer network, a method for identifying relationships between entries in the database comprising the steps of:

generating a general relationship class in the database having a schema that includes at least a first attribute and a second attribute;

identifying two or more classes in the database that share at least one relationship;

selecting a first attribute name and a second attribute name for the at least first attribute and second attribute;

generating at least one instance of the general relationship class;

assigning one or more first values to a corresponding first attribute, wherein the one or more first values include identifiers for types relationships associated with the two or more classes; and assigning one or more second values to a corresponding second attribute, wherein the one or more second values include identifiers that define the two or more classes associated with the one or more first values.

32. The method of claim 31, further comprising the steps of:

assigning an additional first value to the corresponding first attribute of the at least one instance of the general relationship class when a new type of relationship is identified; and assigning an additional second value to the corresponding second attribute that identifies classes that participate in the new relationship.

33. The method of claim 31, further comprising the step of:

removing an existing one of the one or more first values from the first attribute of the general relationship class when an existing type of relationship is to be eliminated; and removing a corresponding one of the one or more second values from the second attribute that identifies classes that participate in the existing relationship to be eliminated.

34. The method of claim 31 further comprising the steps of:

querying the directory to locate the at least one instance of the general relationship class;

reading the one or more first values assigned to the first attribute of the general relationship class to identify types of relationships between the two or more classes; and reading the corresponding one or more second values assigned to the second attribute of the general relationship class to identify classes that participate in the relationships.

35. The method of claim 31 further comprising the step of:

enabling a customization of the at least one instance of the general relationship class in two or more subtrees of the directory; and enabling a customization of the one or more first values or one or more second values associated with the corresponding first attribute or second attribute so that each instance may be placed in a different subtree of the directory.

36. A directory service system for identifying relationships between entries in a database, the system comprising:

the database for managing resources of a computer network, the database configured to operate so as to:

generate a general relationship class in the database having a schema that includes at least a first attribute and a second attribute;

identify two or more classes in the database that share at least one relationship;

select a first attribute name and a second attribute name for the at least first attribute and second attribute;

generate at least one instance of the general relationship class in the directory;

assign one or more first values to a corresponding first attribute, wherein the one or more first values include identifiers for types relationships associated with the two or more classes; and assign one or more second values to a corresponding second attribute, wherein the one or more second values include identifiers that define the two or more classes associated with the one or more first values.

37. The system of claim 36 wherein the database is further configured to assign an additional first value to the corresponding first attribute of the at least one instance of the general relationship class when a new type of relationship is identified, and to assign an additional second value to the corresponding second attribute that identifies classes that participate in the new relationship.

38. The system of claim 36, wherein the database is further configured to:

remove an existing one of the one or more first values from the first attribute of the general relationship class when an existing type of relationship is to be eliminated, and remove a corresponding one of the one or more second values from the second attribute that identifies classes that participate in the existing relationship to be eliminated.

39. The system of claim 36, wherein the database is further configured to:

query the directory to locate the at least one instance of the general relationship class;

read the one or more first values assigned to the first attribute of the general relationship class to identify types of relationships between the two or more classes in the directory; and read the corresponding one or more second values assigned to the second attribute of the general relationship class are read to identify classes that participate in the relationships.

40. The system of claim 36 wherein the database is further configured to:

enable generation of the at least one instance of the general relationship class in two or more subtrees of the directory; and enable customization of the one or more first values or the one or more second values associated with the corresponding first attribute or second attribute so that each instance may be placed in a different subtree of the directory.

* * * * *